UNITED STATES PATENT OFFICE.

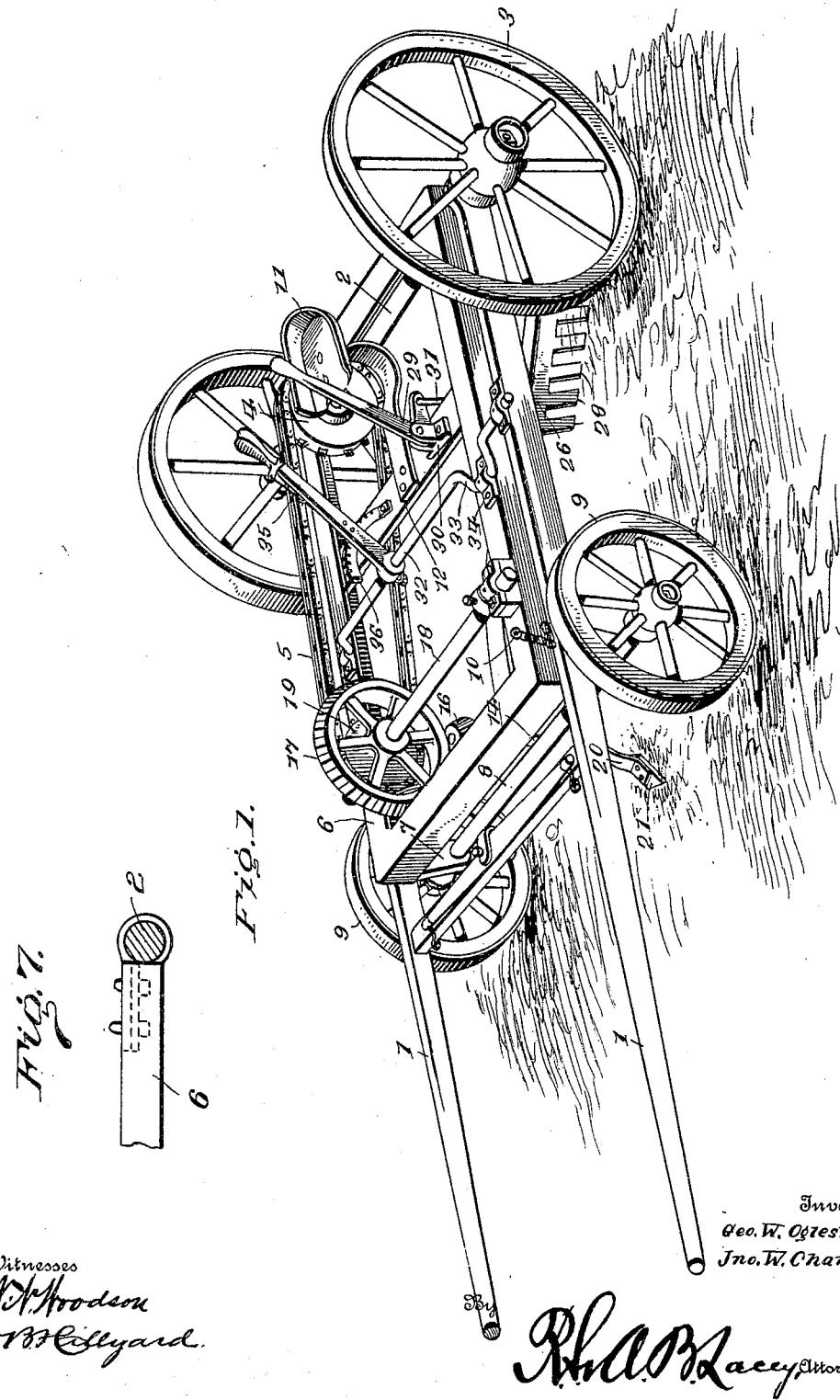

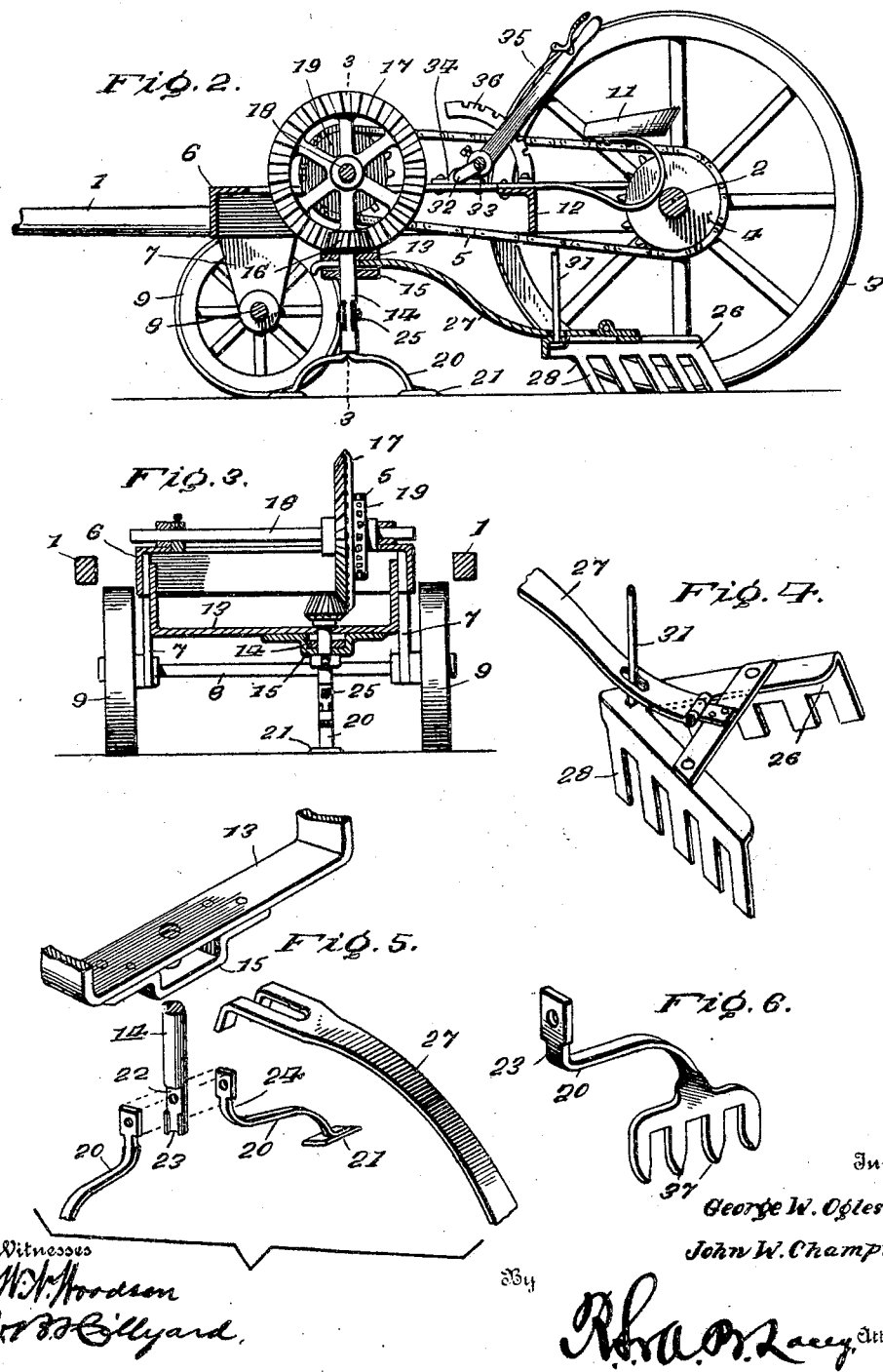

GEORGE W. OGLESBY AND JOHN W. CHAMPION, OF ELBERTON, GEORGIA.

COTTON CHOPPER AND HARROW.

No. 799,932.          Specification of Letters Patent.          Patented Sept. 19, 1905.

Application filed November 2, 1904. Serial No. 231,115.

*To all whom it may concern:*

Be it known that we, GEORGE W. OGLESBY and JOHN W. CHAMPION, citizens of the United States, residing at Elberton, in the county of Elbert and State of Georgia, have invented certain new and useful Improvements in Cotton Choppers and Harrows, of which the following is a specification.

This invention provides an implement for simultaneously thinning and harrowing cotton-plants involving a novel general structure and special features, which are noted more particularly in the subjoined claims.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a perspective view of an implement embodying the invention. Fig. 2 is a central longitudinal section thereof. Fig. 3 is a transverse section on the line $x\,x$ of Fig. 2 looking toward the front, as indicated by the arrows. Fig. 4 is a detail perspective view of the harrow attachment. Fig. 5 is a detail view of the lower end of the vertical shaft and arm carried thereby, the parts being separated. Fig. 6 is a detail view of a modification, showing forks substituted for the chopping-blades. Fig. 7 is a detail view showing the pivotal or loose connection of the main frame with the axle.

Corresponding and like parts are referred to in the following description and indicated in all the views of the drawings by the same reference characters.

The main frame of the implement comprises shafts 1 and axle 2, the latter being provided with ground-wheels 3, connected to the axle in the usual manner, so as to impart rotary movement thereto as the implement is drawn over the field. A spur-wheel 4 is secured to the axle 2 for rotation therewith and imparts movement to a drive-belt 5, by means of which motion is transmitted to the chopping mechanism.

A frame 6, preferably of rectangular form, is loosely mounted at its rear end upon the axle 2, and hangers 7, pendent from the front end of said frame, support an axle 8, provided with ground-wheels 9. Chains or flexible connections 10 connect the side members of the frame 6 with adjacent shafts, so as to prevent a too great lateral and vertical play thereof. The driver's seat 11 is supported by means of a cross-piece 12 of the frame 6. A transverse bar 13 has its end portions upwardly bent and attached to the side pieces of the frame 6 and supports the vertical shaft 14, provided with the chopping mechanism. A keeper 15 is attached to the transverse bar 13, and the vertical shaft 14 is journaled to said transverse bar and keeper. The keeper 15 consists of a plate having its end portions bent upwardly, thence outwardly in opposite directions, and secured to the transverse bar 13 in any substantial manner, the middle portion of the plate being spaced from the bar 13. A bevel-pinion 16 is secured to the upper end of the vertical shaft 14 and is in mesh with a bevel gear-wheel 17, attached to a transverse shaft 18, journaled to the frame 6 near its front end. A spur-gear 19, mounted upon the shaft 18, supports the forward portion of the drive-belt 5, by means of which motion is imparted to the shaft 18 and from the latter to the shaft 14 by means of the bevel-gear 16 and 17.

Arms 20 are attached to opposite sides of the lower end portion of the shaft 14 and curve outward and downward and are provided at their lower ends with blades 21. While the arms may be attached to the shaft in any manner, the construction illustrated is preferred. The shaft 14 has opposite portions near its lower end flattened, as indicated at 22, and a vertical channel 23 extends downwardly from the flattened portion 22 and through the lower end of the shaft and forms a seat to receive the reduced part 24 near the lower end of the shank, by means of which each of the arms 20 is attached to the shaft 14. The arms 20 being oppositely disposed are adapted to be secured to the shaft 14 by a single bolt or fastening 25, the latter passing through corresponding openings in the shaft and shanks of the arms 20.

The harrow 26 may be of any pattern or make and is arranged to operate in the rear of the chopping mechanism. A draft-bar 27 is hingedly connected to the harrow 26, and its front end is bifurcated or forked, as shown at 28, and is downwardly curved, so as to engage in front of the keeper 15 and form the attaching means between the harrow and frame 6. The space between the fork members receives the shaft 14 and admits of said fork members passing upon opposite sides of the shaft when slipping the forked end 28 of the draft-bar into the keeper 15. The harrow 26 is adapted to be adjusted vertically, and for this purpose a lever 29 is pivoted to a standard 30 and is connected to the harrow by means of a rod 31 or analogous device, the same passing through openings in the draft-bar 27 and cross-piece 12. The harrow is held in an adjusted position by any suitable means, such as the usual latch applied to the lever 29 and coöperating teeth formed on the standard 30. The front end of the frame 6 is adapted to be raised and lowered to admit of throwing the chopping mechanism out of action when required and to lift the wheels 9 from the ground when it is required to turn the machine for recrossing the field or other purpose. As shown, a shaft 32 is journaled at its ends to the shafts 1 and is provided with crank portions 33, which are connected by staples 34 or other means to the side piece of the frame 6. The lever 35 projects from the shaft 32 and extends within convenient reach of the driver's-seat, so as to be operated at will. Any means may be supplied for holding the lever 35 in an adjusted position. As shown, a notched bar 36 is pivotally connected at its lower end to the cross-piece 12 and is adapted to engage over the shaft 32 and hold the frame 6 and lever 35 in the desired position. In the construction shown in Fig. 6 forks 37 are substituted for the chopping-blades, and the shanks of their arms are provided with a series of openings to admit of adjustably connecting the forks with the lower end portions of the shaft 14. The forks operate in the manner of rakes and uproot the plants to be destroyed in the operation of thinning the rows.

An implement constructed substantially as herein disclosed when drawn over the field thins rows and at the same time harrows the soil between the rows, thereby gradually reducing the work and enabling both operations to be performed at one time.

From the foregoing it will be observed that the frame 6, carrying the chopping mechanism and the harrow, is vertically adjustable, thereby admitting of simultaneous movement of both parts, whereas the harrow has an independent movement, thereby admitting of its adjustment with reference to said chopping mechanism to meet existing conditions.

Having thus described the invention, what is claimed as new is—

1. In an implement of the character described, the combination of an axle provided with ground-wheels, shafts loosely connected at their rear ends with said axle, a frame arranged between the rear portions of the shafts and loosely connected at its rear end to said axle and free at its front end, chopping mechanism carried by said frame, and actuating means therefor.

2. In an implement of the character described, the combination of an axle provided with ground-wheels, shafts loosely connected at their rear ends with said axle, a frame arranged between the rear portions of the shafts and loosely connected at its rear end to said axle and free at its front end, chopping mechanism carried by said frame, and means for imparting movement to the chopping mechanism from the said axle.

3. In combination, an axle, shafts loosely connected therewith, a frame arranged between the shafts and loosely connected at its rear end with the axle, chopping mechanism carried by said frame, loose connections between opposite sides of the frame and shafts, means for supporting the front end of the frame and adapted to travel upon the ground, and means under control of the driver and mounted upon the shafts to admit of raising the front end of the frame to throw the chopping mechanism out of action and the supports for the front end of the frame out of contact with the ground.

4. In combination, an axle provided with ground-wheels, shafts loosely connected to said axle, a frame arranged between the shafts and pivotally mounted at its rear end upon said axle, hangers at the front end of the frame, a shaft journaled in said hangers and provided with ground-wheels for supporting the front end of the frame, chopping mechanism arranged near the front end of the frame, means for imparting motion to the chopping mechanism from said axle, and means under control of the driver for raising and lowering the front portion of the frame to throw the chopping mechanism out of action and to cause the ground-wheels normally supporting the front end of the frame to clear the ground, substantially as set forth.

5. In combination, a frame, a vertical shaft journaled to said frame and provided with chopping mechanism, a harrow, and a draft-bar extended forward from the harrow and forked at its front end to receive said vertical shaft and engage with a part of the frame, substantially as set forth.

6. In combination, a frame, a vertical shaft journaled to said frame and provided with chopping mechanism, a harrow, a draft-bar hingedly connected at one end to said harrow and at its opposite end to said frame, means for adjusting the frame vertically to raise or lower the chopping mechanism and harrow, and other means mounted upon said frame for independent adjustment of the harrow with reference to the chopping mechanism.

7. In combination, a drive-axle, a frame, a shaft journaled to said frame, connecting means between said shaft and drive-axle, a vertical shaft provided at its lower end with chopping mechanism and in gear at its upper end with the first-mentioned shaft, means for adjusting said frame vertically for raising and lowering the chopping mechanism, a harrow connected with the frame and movable vertically therewith, and other means for adjustably connecting said harrow with the frame to admit of regulating the height of the harrow with reference to the chopping mechanism.

8. In combination, a shaft having a side portion near one end flattened and having a channel extended from the flattened portion through the end of the shaft, and an arm having a portion of its shank reduced and seated in said channel, and the arm secured to said flattened part of the shaft, substantially as set forth.

In testimony whereof we affix our signatures in presence of two witnesses.

GEORGE W. OGLESBY. [L. S.]
JOHN W. CHAMPION. [L. S.]

Witnesses:
G. S. A. ALMOND,
GEO. H. SMITH.